(12) United States Patent
Van Dinh et al.

(10) Patent No.: US 7,079,531 B2
(45) Date of Patent: Jul. 18, 2006

(54) METHOD AND APPARATUS FOR PROVIDING A SOFTWARE ADAPTION LAYER IN A TELECOMMUNICATIONS SYSTEM

(75) Inventors: Le Van Dinh, Boca Raton, FL (US); Amruth Laxman, Boca Raton, FL (US); Jesus L. Sarmiento, Miami, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 995 days.

(21) Appl. No.: 10/109,196

(22) Filed: Mar. 28, 2002

(65) Prior Publication Data

US 2002/0186712 A1 Dec. 12, 2002

Related U.S. Application Data

(60) Provisional application No. 60/279,295, filed on Mar. 28, 2001, provisional application No. 60/279,279, filed on Mar. 28, 2001.

(51) Int. Cl.
*H04L 12/56* (2006.01)

(52) U.S. Cl. .................. 370/386; 370/360; 709/230

(58) Field of Classification Search ........ 370/352–356, 370/400, 401, 386, 360; 455/518; 709/230, 709/203
See application file for complete search history.

(56) References Cited

U.S. PATENT DOCUMENTS

| 6,760,324 B1 * | 7/2004 | Scott et al. ............. 370/352 |
| 2002/0102999 A1 * | 8/2002 | Maggenti et al. ......... 455/518 |
| 2002/0120760 A1 * | 8/2002 | Kimchi et al. ............. 709/230 |

* cited by examiner

*Primary Examiner*—John Pezzlo

(57) ABSTRACT

A software adaptation of a Time Division Multiplexing (TDM) telecommunications line and trunk group control sub-system is described. The adaptation permits this legacy software to run under various operating systems and provide essential functions to a packet based switching system. This method of reuse permits continual use of proven and dependable software features to operate under new packet based topologies. The legacy software runs in a new softswitch environment with minimal redesign. Timer and interrupt functions are altered to comply with off-the-shelf operating systems. Error recovery and restart operations are isolated to remove awareness from the operating system but still permit the legacy software to recover in conventional manner.

17 Claims, 10 Drawing Sheets

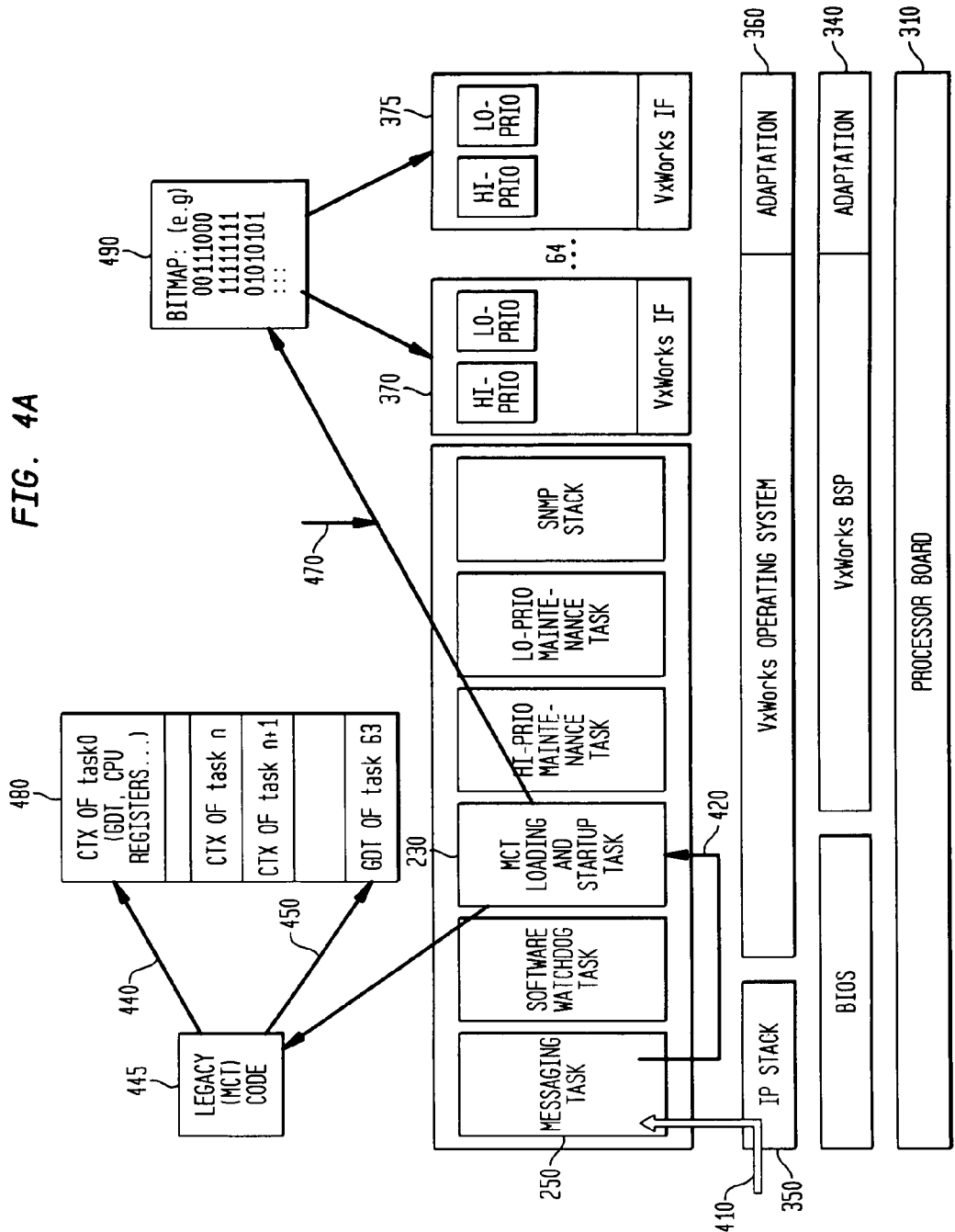

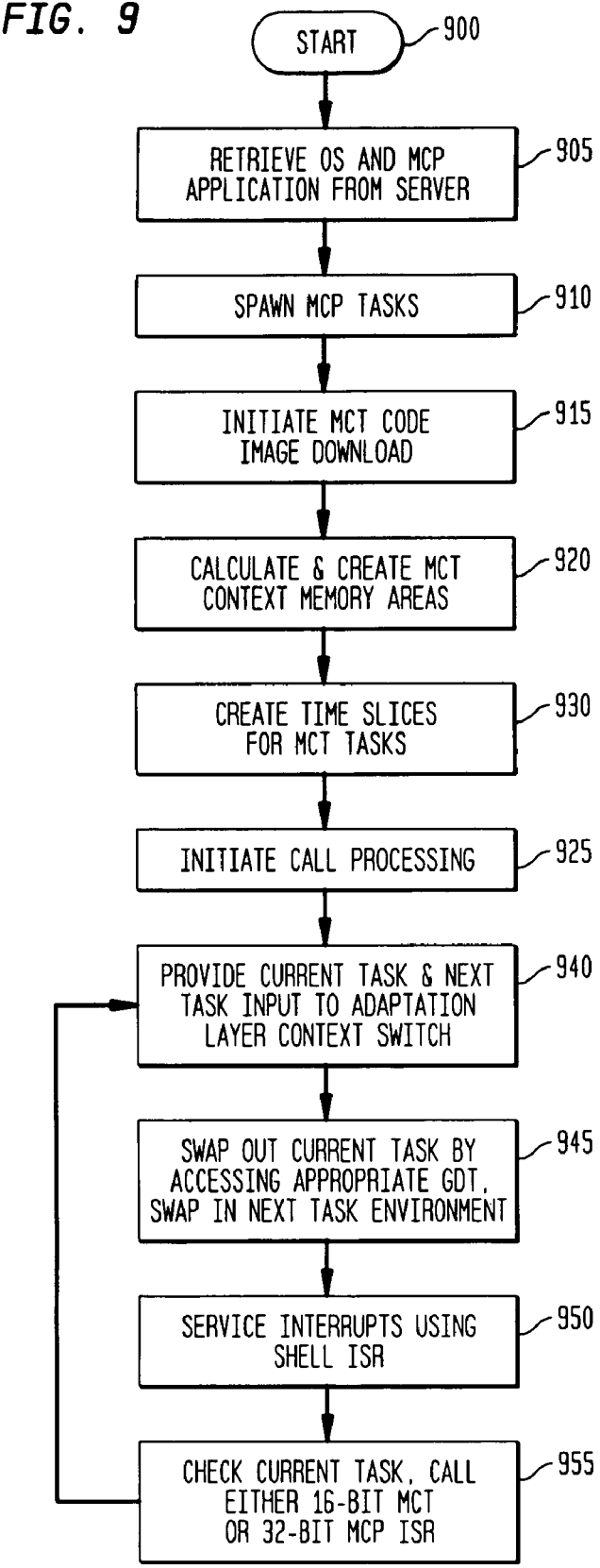

METHOD AND APPARATUS FOR PROVIDING A SOFTWARE ADAPTION LAYER IN A TELECOMMUNICATIONS SYSTEM

CROSS REFERENCE TO RELATED APPLICATIONS

This application claims the benefit of priority under 35 U.S.C. 119(e) to two copending U.S. Patent Provisional Applications, Ser. Nos. 60/279,295 and 60/279,279, both filed on Mar. 28, 2001, the contents of each of said applications being incorporated by reference herein.

This application is also related to the following U.S. Patent Applications: U.S. patent application Ser. No. 10/109,293 filed Mar. 28, 2002 entitled Distributed Architecture for a Telecommunications Software Switch; U.S. patent application Ser. No. 10/108/603 filed Mar. 28, 2002 entitled Distributed Architecture for a Telecommunications System; U.S. patent application Ser. No. 10/109,128 filed Mar. 28, 2002 entitled Method and Apparatus for Messaging Protocol Within a Distributed Telecommunications Architecture; U.S. patent application Ser. No. 10/115,453 filed Mar. 28, 2002 entitled Method and Apparatus for a Deriving a Standard MAC Address from A Physical Location; U.S. patent application Ser. No. 10/109,157 filed Mar. 28,2002 entitled Method and Apparatus for A Centralized Maintenance System within a Distributed Telecommunications Architecture; and U.S. patent application Ser. No. 10/109,149 filed Mar. 28, 2002 entitled Method and Apparatus for Providing a Proprietary Data Interface in a Distributed Telecommunications System, the contents of each of said applications being incorporated by reference herein.

BACKGROUND OF THE INVENTION

1. Field of the Invention

The present invention generally relates to a software adaptation layer in a telecommunications system, and more particularly to a method an apparatus that permits established legacy software to operate in a new telecommunications system.

2. Background Description

In the telecommunications industry, evolution of products is a continual process. These products are of various specific purposes but relate to switching voice and data communications. Expended investment in development cost and development time for sophisticated telecommunications products has been very large. The equipment that is part of the national and international switching fabric is the result of millions of dollars of design and development investment.

One primary technology that has been the backbone of core telecommunication switching platforms has been Time Division Multiplexing (TDM). TDM has been the preferred internal circuit connection method of central office switches over the last few decades. Extensive hardware interfaces have been designed to provide communication circuitry and supporting feature support. Features such as call waiting, conferencing, tone detection and generation, voice generators, system maintenance, trunk testing, line testing, etc. have been supported by both the hardware design and supporting software (SW) logic controls via microprocessors. The amount of development time and expenditure has been very large.

The supporting software to control the processors within the TDM switching systems has been the result of extensive long-term design efforts involving many hundreds of design engineers over many years. The software within the switching platforms represent extensive industry defined features. These features have been perfected and have reached maturity. As a result, worldwide customers have become familiar with the features and have come to rely upon the proven and consistent behavior. The complexity of the features when considered in view of the total operational requirements of the switching platform represents a proven level of engineering accomplishment which is not easily replicated in time or financial investment.

Technology advances in packet switching has propelled the telecommunications industry into a new era. TDM switching is now being replaced by packet switching concepts also known as soft-switches. Voice and data are now carried routinely in packet switching architectures. The hardware configurations and essence is substantially different in a packet switch. Many functions that were once a hardware implementation in a TDM world is now replaced by software or software with much less discrete hardware components. Much higher capacity microprocessors, digital signal processors, memories, and specialty chips have enabled more features and functions to be done in the software domain.

But the investment of feature capabilities and software design investment in the TDM switching platforms cannot be readily duplicated. Therefore, the extensive software logic programs that was once designed for a TDM switching environment may be leveraged and its actual life extended if a manner of transforming the legacy software into the packet switching domain can be provided.

Migration or reuse of legacy software onto a new packet based switching architecture has several advantageous if the costs or risk is reasonable. If the established base of features and functions within the legacy software can be reused by strategic modifications, the cost and risk of new software designs is substantially mitigated. This technique can result in a familiar and known feature set complement which has demonstrated performance history to become a valuable part of a new packet based communications platform.

A significant subsystem in a TDM legacy telecommunications switch such as a Siemens EWSD (German acronym for Digital Switching System) is a Line and trunk group (LTG) module. The LTG hardware and software control provides the interface between the switching system TDM switching fabric of the coordinating processor and the outside world. The hardware interfaces to the outside world include devices such as T1 trunks, E1 trunks, CCS (common channel signaling) lines, etc. The interface from the LTG to the system coordinating processor (or Network Services Processor) includes two HDLC (High Level Data Link Control) redundant message channels.

The LTG subsystem contains core telecommunications functions such as tone generators, digit receivers, local subscriber TDM cross-connect time switch (connects subscriber A to B or TDM timeslot A to B), and other traditional TDM components such as conference capability and TDM transmission pad level (attenuation) controls.

A given LTG software unit is constrained with a logical sizing limitation. Its inherent design can address and control only 120 trunks and 2048 lines. This legacy design also employed 16-bit software addressing schemes. Migrating a 16-bit software system to 32-bit processor environments is not an easy matter. Interrupts do not work directly, software addressing is limited, and processor advantages are restricted.

The problems to be solved are the conversion and reuse of as much LTG software logic as possible, to keep the established and proven capabilities intact while at the same time expand the effective addressing limits of interface devices, and simultaneously employing more modern software concepts and operating systems.

This software reuse must then operate transparently within the architecture of a packet switching based system The present invention of this application provides a novel solution to these issues.

SUMMARY OF THE INVENTION

It is therefore an object of the invention to provide a method and apparatus for reusing legacy line and trunk group software in a packet based switch by providing an adaptation layer.

It is another object of the invention to provide a method to transform the legacy software to operate under a commercial operating system (OS) from a custom OS, the commercial OS essentially unaware of the legacy software due to an intermediary context switch layer.

It is yet another object of the invention to provide a means to establish internal timer and clock functions based upon the new OS services.

Further, it is yet another objective of the invention to provide a method to preserve the functional and control logic of the legacy LTG software so that the LTG features are operational in the new packet based switch.

Further, it is still another objective of the invention to extend the operational device limits of the LTG software by instantiating multiple instances of the migrated LTG software data memory.

Furthermore, it is yet another objective of the invention to provide interrupt and error processing adaptation so that the legacy software is essentially unaware of the new OS and packet based environment.

Further yet, it is another objective to permit mix-mode software operation such as 16-bit software and 32-bit software to run harmoniously on the same platform.

According to the invention there is a method and apparatus that provides reuse of extensive line and trunk group (LTG) software from a legacy TDM telecommunications switching system in a packet based switching system. The LTG legacy software provides the controls and operational features involving a variety of telecommunications features and functions such as tone detection, tone generation, trunk and line signaling controls, common channel signaling, conference control, pad (attenuation) controls, error processing, and software download and initialization, etc.

A LTG module in a legacy system has both TDM hardware and software controls. As part of a packet based switch, however, the TDM hardware essentially ceases to exist and the physical interconnectivity is replaced with packet based messaging concepts which are mostly software controls and operations.

The LTG is migrated to a new soft-switch role by placing the operational logic within novel adaptation software layers and modifying essential environment interfaces to run under a new commercial available OS such as VxWorks or Linux.

The LTG software runs 16-bit software. An adaptation layer provides a gateway for this 16-bit software to operate in and access external messages and operating system services that are 32-bit or higher logic.

The modified LTG software becomes known as a Media Control Task (MCT) running in a soft-switch platform known as a Media Control Platform (MCP). A softswitch may contain multiple MCPs. The MCP is a powerful microprocessor based board that provides a memory system and communications interface to other components within a soft-switch. The MCP provides a software environment for up to 64 or more Media Control Tasks running simultaneously under a real-time OS such as VxWorks. Each MCT is an independent call processing entity. The legacy LTG software is reused extensively to provide the MCT function.

The MCP OS provides typical operating system software services to the tasks running under it such as timers, interrupts, messaging, task scheduling, etc. However, this invention provides for multiple instances of the MCTs running concurrently with the kernel privilege in multi segments protected mode. This is done by an adaptation layer between the MCTs and the OS, which allows each MCT to run in its own logical data space. This data space provides the necessary and classical definition of the line and trunks under control of each MCT and the dynamic transitory data spaces to process a call. Each MCT receives equal access to processor time. Before one of the 64 Media Control Tasks is given processor control, another adaptation layer context-switch step is performed that saves the current processor state and environment of the currently running 16-bit MCT, then the previously saved context state of the next MCT is restored. This is another adaptation of mix-mode software operation.

The OS also stores and forwards messages that originate from or are destined to any MCT. This is accomplished through a Messaging Task. This task steers messages to the proper MCT instance based upon the logical device addressed by the message.

By abstracting legacy LTG software in this manner, substantial time, financial investment and proven technology can be reused to achieve a new step in the telecommunications technological evolution path.

BRIEF DESCRIPTION OF THE DRAWINGS

The foregoing and other objects, aspects and advantages will be better understood from the following detailed description of a preferred embodiment of the invention with reference to the drawings, in which:

FIG. 4A is a flow block diagram showing the loading and startup task and resulting data structures;

FIG. 9 is a flow diagram showing a method of creating and initializing an MCP software environment.

DETAILED DESCRIPTION OF A DETAILED EMBODIMENT OF THE INVENTION

Figure 1:
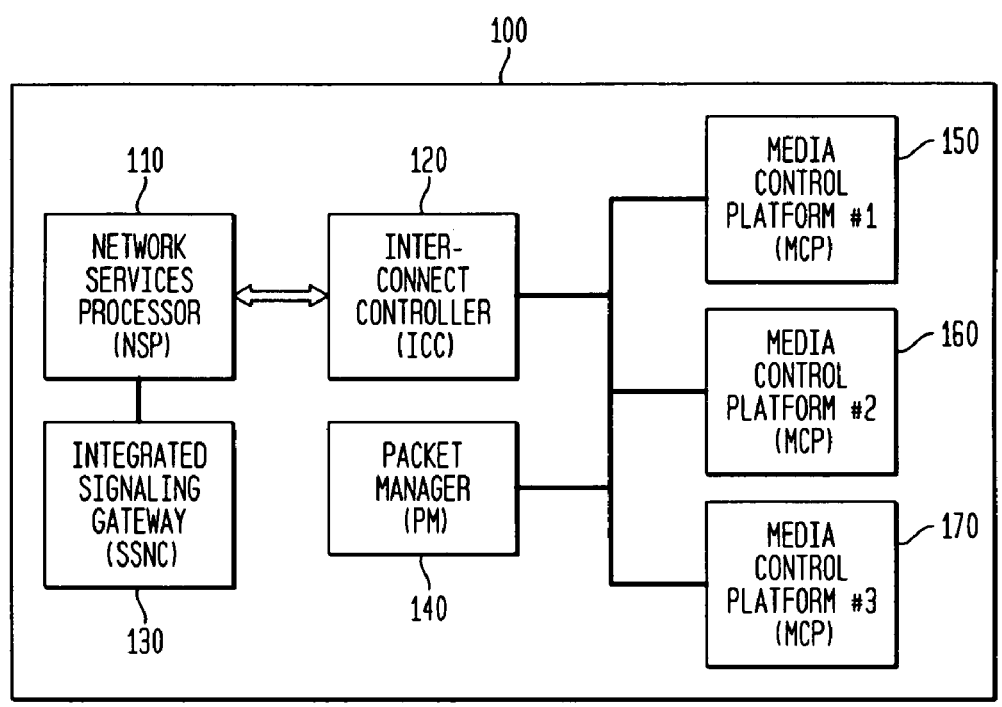
FIG. 1 is an exemplary block diagram of main components of a soft-switch.

Referring to FIG. 1, exemplary main components of a soft-switch 100 are shown. These components are coupled directly or indirectly as shown. The Network Services Processor (NSP) 110 role is to provide the database and coordination control of the soft-switch. This is where the global feature definitions are controlled. It performs loading of necessary data to the Media Control Platforms (MCP) 150, 160 and 170 and also performs those coordinated functions necessary to keep the system running (e.g., maintenance, recovery, administration, alarming, etc).

The Inter-Connect Controller (ICC), 120, is a multifunctional unit. It provides a bi-directional interface between the NSP and the distributed MCPs. It also supervises the LAN (Ethernet, as an example) interfaces (not shown) and performs inter-platform message routing.

The Integrated Signaling Gateway, 130, performs the signaling gateway function. It terminates Number Seven Signaling (SS7) or Stream Control Transmission Protocol (SCTP) signaling messages from an external network and converts them into internal messages.

The packet manager (PM), 140, provides, as one of its functions, the interface to the Media Gateways (MG). Media Gateways are connected to end-offices (EO) and contain real trunks, usually TDM trunks (or may be virtual Asynchronous Transfer Mode (ATM) paths). Each MG trunk connected to TDM circuits has a physical appearance in the Media Gateway as a DS0 channel (within a T1 or DS3). Each MG trunk is assigned a dedicated virtual MCT port. MCTs can control and refer to these trunks as needed for call processing. A soft-switch can support many thousands of trunks.

The Media Control Platform (MCP), 150, 160, and 170 consists of a slot based CPU (e.g., Pentium III or IV 500 mhz or better) in a backplane. The MCP provides a platform for media control functions, which work with the software in the NSP to provide media control features. Many MCPs may exist in a soft-switch environment.

Figure 2:
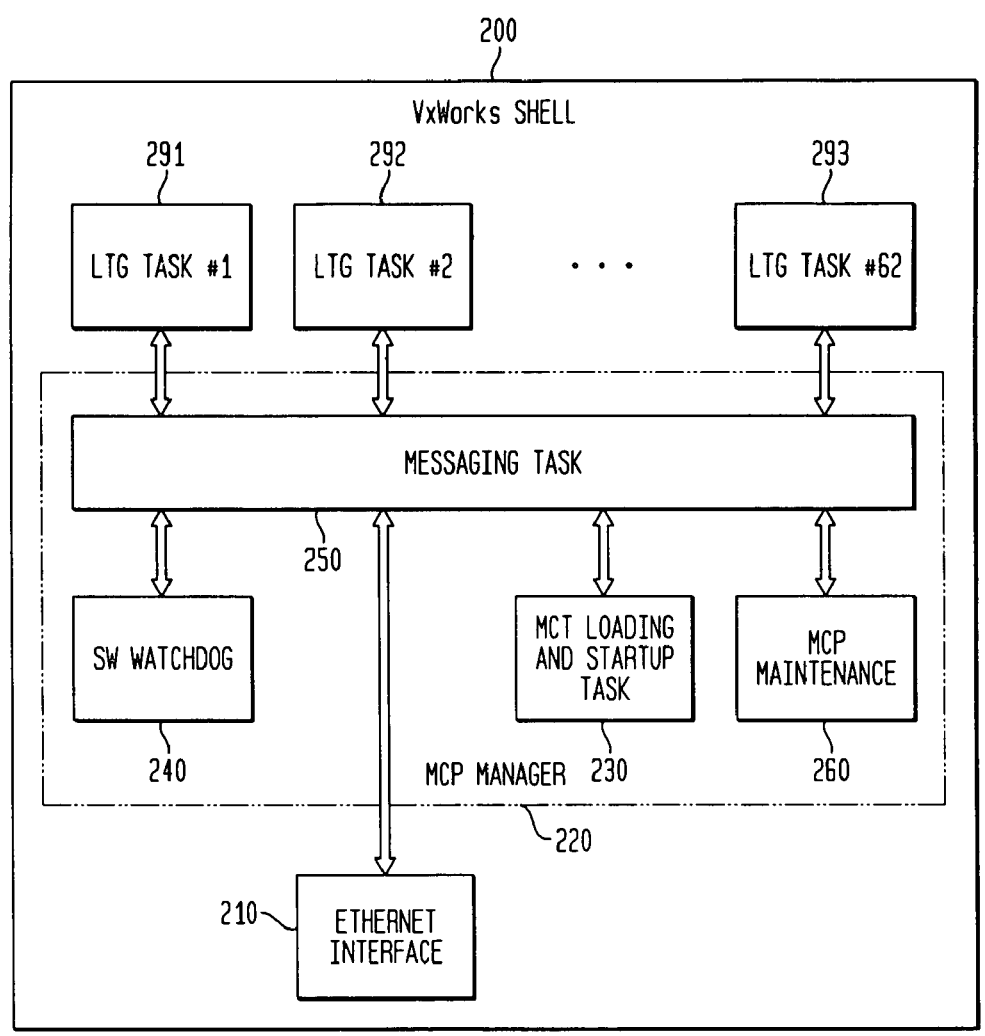
FIG. 2 is an exemplary block diagram of one of the components of the soft-switch of FIG. 1, the MCP software environment.

Referring now to FIG. 2, an MCP software environment, 200, contains several functional parts. The first part is a MCP Manager, 220, comprising a Messaging Task, 250, a SW Watchdog task, 240, a MCT Loading and Startup Task, 230, and a MCP Maintenance Task, 260. Another is Media Control functions comprising the LTG tasks (i.e., MCT tasks) 291, 292, and 293, and the LAN (Ethernet) connectivity interface, 210. The entire software environment is controlled by an operating system such as the commercial VxWorks product which runs under the microprocessor and associated memory.

The Messaging Task, 250, is a multi-functional task providing the interface to the Ethernet for communications between all tasks on the MCP and the NCP or other distributed platforms. It also provides an interface with the ICC, 120, for maintenance of the LAN and the message channels associated with the MCTs.

The MCT Loading and Startup Task, 230, provides an interface to the NSP for loading of MCT software. It is also responsible for managing and manipulating the context associated with each MCT, and for spawning each MCT task in its correct context.

The MCP Maintenance Task, 260, performs general maintenance functions on the MCP, including handling reset requests from the NSP and for performing firmware and software upgrades as well as MCT code patching.

The SW Watchdog Task, 240, is responsible for monitoring all MCP and MCT tasks to ensure each task is running correctly.

The LTG tasks also known as MCT tasks, 291, 292, and 293 contain the adapted legacy software logic to provide a plethora of telecommunications call control features.

TABLE A summarizes legacy features that are provided by the LTG software are generally known to one skilled in the art and known in the industry. This is the software functionality that has been preserved and reused by the MCT software to provide the same feature functionality in a packet based soft-switch. These features include but not limited to:

TABLE A

| LINE FEATURES | TANDEM FEATURES |
|---|---|
| Three Way Calling | Tandem Office Capability Feature |
| Centrex Call Forwarding | Limited Local Tandem Switching |
| Centrex Call Origination Restrictions | Local Inter-Tandem Switching |
| | 900 Service Access - Split Routing |
| Centrex Call Termination Restrictions | LNP Enhancements for Access Tandem Offices |
| Centrex Dialing Plan | |
| Centrex Private Facilities | LNP Network Management Enhancements |
| Code Restriction | |
| Customer Originated Trace | Network Management |
| Denied Origination | Surveillance data - Processor Occupancy |
| Centrex Announcements | |
| Call Hold | Two-Way Tandem Connecting Trunks (Not Coded) |
| Intercom Dialing | |
| Call Forwarding (IAD PBX) | Primary Intertandem (IT) Connecting Trunks |
| Call Waiting (IAD PBX) | |
| MLHG Queuing | 800 Service Trunks |
| MLHG Update Capability | Access Tandem Call Processing |
| Message Rate Service Area | Trunk-to-Trunk Test Connections |
| OUTWATS | |
| Selective Call Acceptance | 3-Digit Translation |
| Selective Call Forwarding | NXX Office and Special Purpose Codes |
| Selective Call Rejection | |
| Simulated Facility Groups | NXX Area Codes |
| Speed Calling | 6-digit Translation |
| Call Pickup Features | Digit Deletion |
| Centrex Call Transfer Variations | Digit Prefixing |
| Outgoing Facility Group Queuing | Code Conversion |
| Call Transfer | Route Advance Logic |
| Calling Name Delivery | Trunk Class Screening |
| Equal Access to Interexchange Carriers | Common Channel Signaling |
| | Multiple Trunk Test Capability |
| Local Number Portability | Two-Way Trunk Maintenance |
| CALEA | Trunk Group Controls |
| AIN Triggers | Network Management Surveillance Data |
| Call Forwarding (inter-IAD) | |
| Assume Dial "9" | Centralized Network Management |
| Automatic Facility Routing | NM Audits and Alerts |
| Automatic Route Selection | Message Administration |
| Call Waiting Originating | Backup Network Management Capabilities |
| Calling Number Delivery | |
| CAT Codes | Access Tandem AMA |
| Centrex Attendant Codes | 800 Service Function - Originating Screening Office |
| Denied Termination | |
| Do Not Disturb/Advanced DND | Traffic Measurements (Tandem) |
| Facility Restriction Level | Maintenance Measurements (Tandem) |
| Flat Rate Service Area | |
| Intercom Dialing | Access Tandem Traffic and Maintenance Measurements |
| INWATS | |
| MLHG Forced Announcement | Separate Routing of NPA - Directory Assistance Calls |
| MLHG Hunt Busy Limit | |
| MLHG Hunting Algorithms | Store and Forward AMATPS Teleprocessing Capability |
| Stop Hunt | |
| Terminal Make Busy | 900 Service Access |
| Toll Restriction/Enhanced Toll Restriction | CCS Exchange Access Interface |
| | AMA 56 Kbps Data Link |
| Unidentified Call Rejection | Software Carrier Group Alarm |
| Voice Assisted Dialing | EADAS/NM Interface |
| Voice Mail Service | EADAS Interface |
| Automatic Callback | RMAS Interface |
| Automatic Recall | Number 2 Switching Control Center System (SCCS) Interface |
| Call Park | |
| | Operations System Standard Interface |
| | Trunk Group Circular Hunt |

Figure 3:
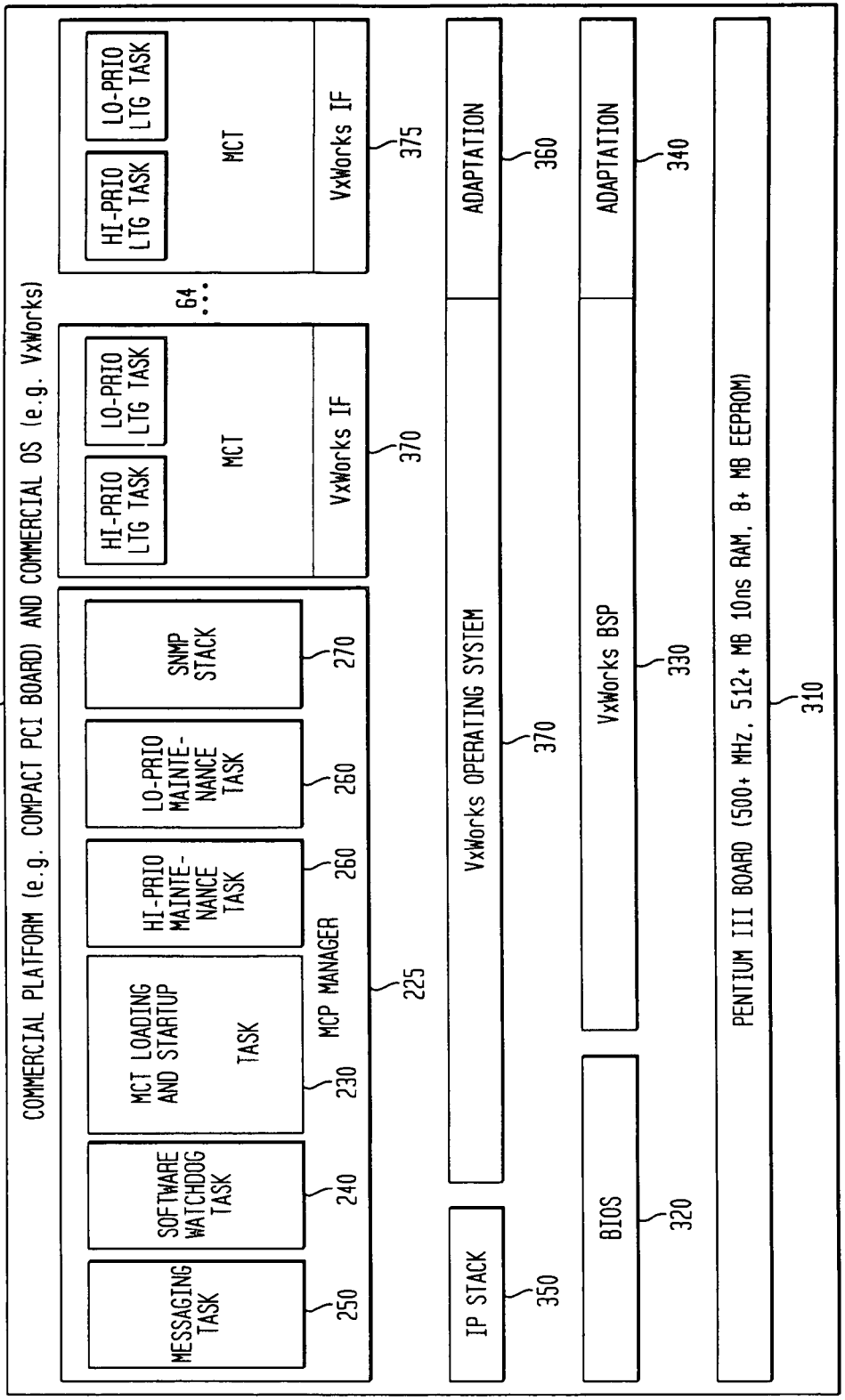
FIG. 3 is an a more detailed exemplary block diagram showing components of the MCP.

Referring to FIG. 3, the commercial platform, 300, used to embody the MCP is shown. It can be a compact Peripheral Component Interconnect (PCI) board or other suitable microprocessor platform. The processor can be a processor such as an Intel Pentium III, 310, running at 500 mhz or higher. The board will contain a typical Pentium compliant basic input/output system (BIOS), 320, an Internet Protocol Stack (IP Stack), 350, for buffering and controlling packet messages and a VxWorks or equivalent board support package, 330, which is processor and hardware specific support such as drivers, or specific Ethernet stack. The OS itself, 370, controls the real-time operation of the software on the processor, 310. The OS can be one of many commercial products such as Linux or VxWorks. Adaptation layer, 340, are hardware specific adaptions to support flash disks and Ethernet cards. Adaptation layer, 360, is a specific inventive element that provides a software abstraction and adaptation concerning SW context switching and interrupt service routines (ISR). This inventive aspect will be discussed more below. Within the MCP Manager, 225, are several components from FIG. 2, however one new component is shown. This is the Simple Network Management Protocol (SNMP) stack that is used for a variety of reasons including remote maintenance access.

The MCT loading and startup task, 230, is one of the software adaptations of this invention that mimics the legacy firmware and recovery software to receive (download) one single copy of the legacy software from a remote coordination processor (e.g., NSP) and then spawns as many as sixty-four legacy incarnations or instances, which share the same code space but have their own data memory areas. The remote coordination processor (e.g., NSP) is not aware of the SW adaptation layer, thinking that it communicates with sixty-four individual legacy platforms. Each of the sixty-four incarnations thinks that they run under their own native environment.

The illustrative MCT instances, 370 and 375 are two of sixty-four possible instances of the legacy LTG software. More are possible in other embodiments. This software is typically sixteen-bit assembly code legacy operating system and switching application software with one copy per hardware platform. Now with these inventive adaptation layers, as many as sixty-four copies of the legacy software runs on one commercial platform.

Referring to 4A, when legacy code image, 445, originating from the NSP, 110, is sent to the Messaging Task, 250, using an internal message, 410. The code image arrives through the IP Stack, 350, and is forwarded to the Loading and Startup Task, 230.

From the code image information just loaded by the MCT Loading and Startup task, 230, the MCT Loading and Startup task also creates the contexts of each MCT tasks 0–63 as shown by expansion block 480. The Context_table_ (CTX) array (CTX array), 480, contains a Global Descriptor Table (GDT) which describes the memory assigned to each MCT task. This memory must be unique to each task with no overlap. It is calculated by adding data and stack segments of the original legacy GDT, which is embedded in the legacy code image. In addition to the GDT, the CTX array provides the storage space for the central processing unit (CPU) registers, such as CS (Code Segment), DS (Data Segment), ES, FS, and GS (additional code segments), SS (Stack Segment), DR0-7 registers, which are altered by the commercial OS during interrupt handling and tasks context switching.

Figure 5:
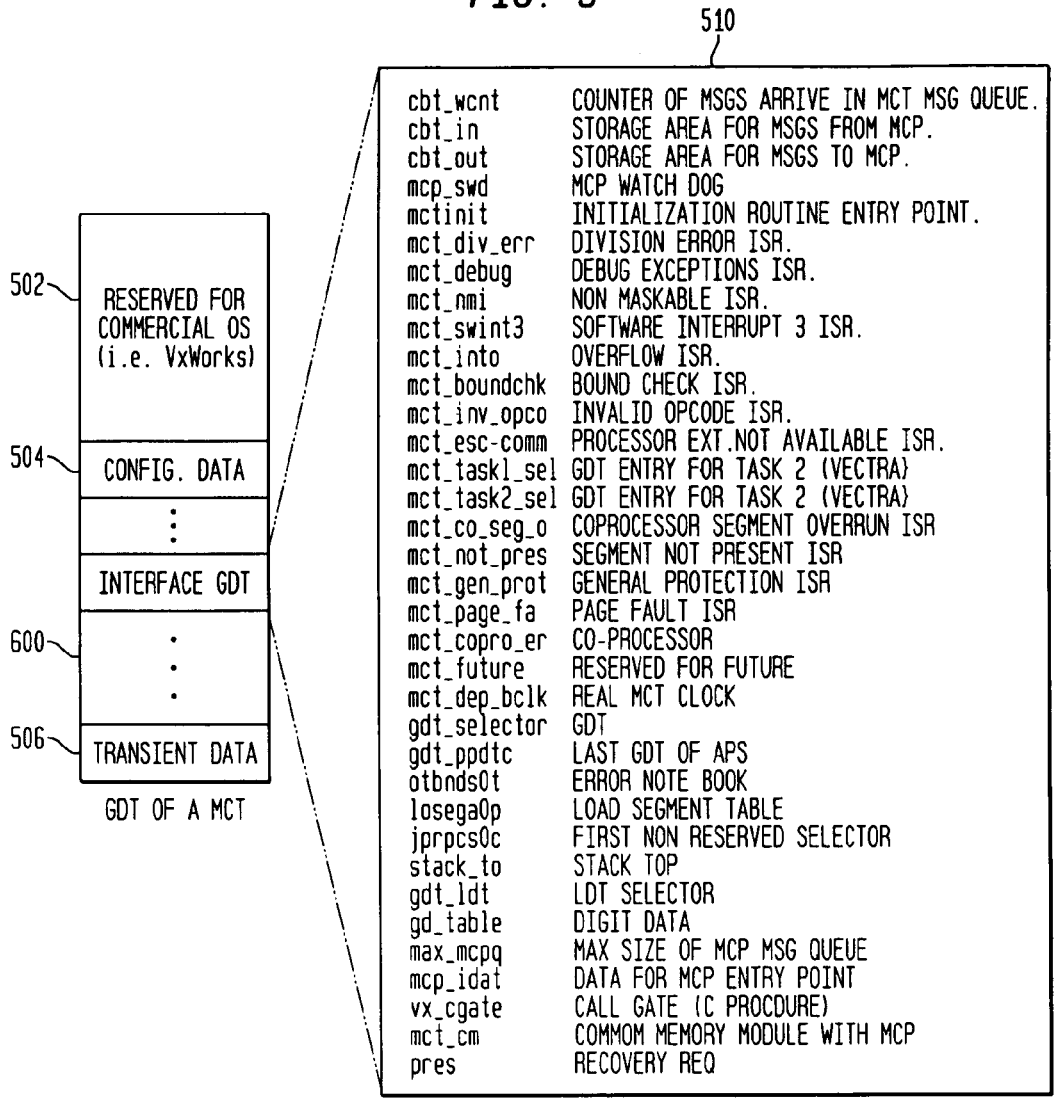
FIG. 5 is a block diagram showing an exemplary GDT of a MCT in more detail.

FIG. 5 shows in more detail the structure of an exemplary GDT, 600. The sections of the GDT include a space for the OS to operate within, 502, configuration data, 504, interface GDT, 510, and transient data for processing, 506. The contents of the interface GDT, 510, are exploded which is a part of the present invention's adaptation. This interface GDT provides the steering mechanism to the location of essential entry address points into the legacy LTG software logic and data. The contents of the interface GDT is representative, but reflect the essential linking addresses of routines and logic in the MCT software. These are typically state-driven software entry addresses, data memory addresses and constants. Registers are also initialized.

At the end of the legacy code loading, the NSP sends a bitmap, 490, to the MCP as shown in FIG. 4A. Based on the bit setting arrangement in the bitmap, the Loading & Startup task eventually starts the corresponding MCT task. When started, the MCT tasks are able to receive configuration and subscriber data directly from the NSP and eventually begin processing traffic.

Figure 4B:
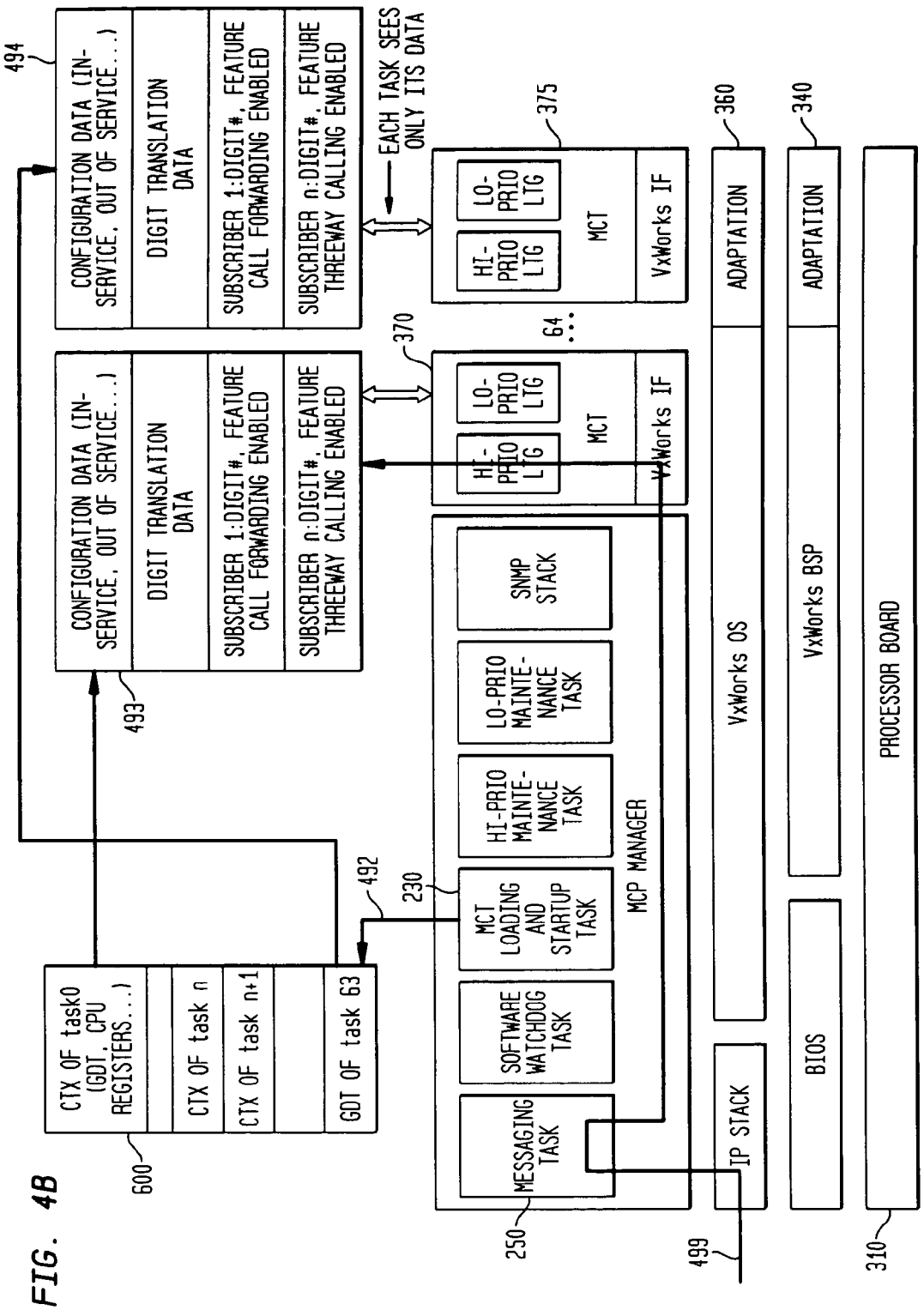
FIG. 4B is a flow block diagram showing creating MCT context memory data areas.

Referring to FIG. 4B, after the legacy code loading is complete, the Loading and Startup task, 230, calculates the size of the individual data of each legacy task. It then allocates the memory for each task and stores their addresses, shown as 492, in the task context table, 600. A context switching routine, 605 (FIG. 6), uses this table to assign the right memory space to the next task, shown as 493 (corresponds to MCT task 370) and 494 (corresponding to MCT task 375).

Figure 6:
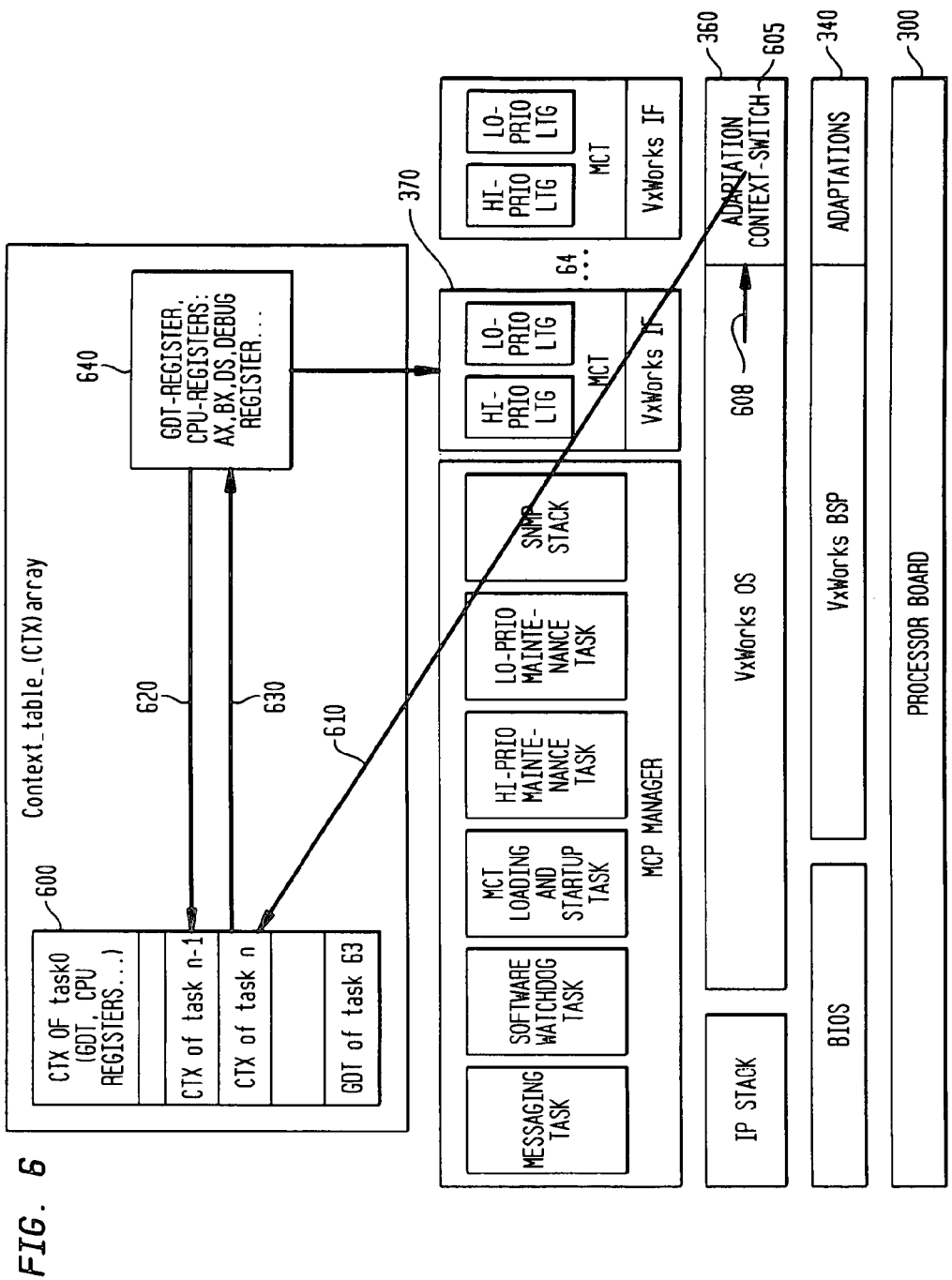
FIG. 6 is a flow block diagram showing the use of the context array by the Context-Switch adaptation layer.

Each of the MCT tasks that has been started by the Loading and Startup Task receives control of the processor when the VxWorks OS schedules a MCT a task. This is done on a regular interval such as a 1-millisecond rate. During a task switch, VxWorks calls an adaptation routine illustratively named Context-Switch, 605, as shown in FIG. 6. VxWorks provides to Context-Switch as input (shown as 608) the current task (n−1) to be suspended and the next task (n) to be started. This Context-Switch swaps out the current task with the next task. This is based upon the bitmap, 490 (FIG. 4A). Context-Switch accesses, shown as 610, a Context-Table (CTX) array, 600, saves the processor state, 640, of task n−1 as shown by the data flow arrow, 620, in the proper array location associated with task n−1. The next task n has its processor state restored as shown by data flow arrow, 630. Actual transfer of processor control follows this processor state restoration to the MCT address restored, which could be any one of the 64 MCT tasks such as 370.

A MCT task runs as if it were in a legacy environment, believing it is the only task running in the system as it was in a legacy environment. It will be interrupted when the next 1 ms-timer tick occurs and the OS repeats the Context-Switch swap operation.

Figure 7:
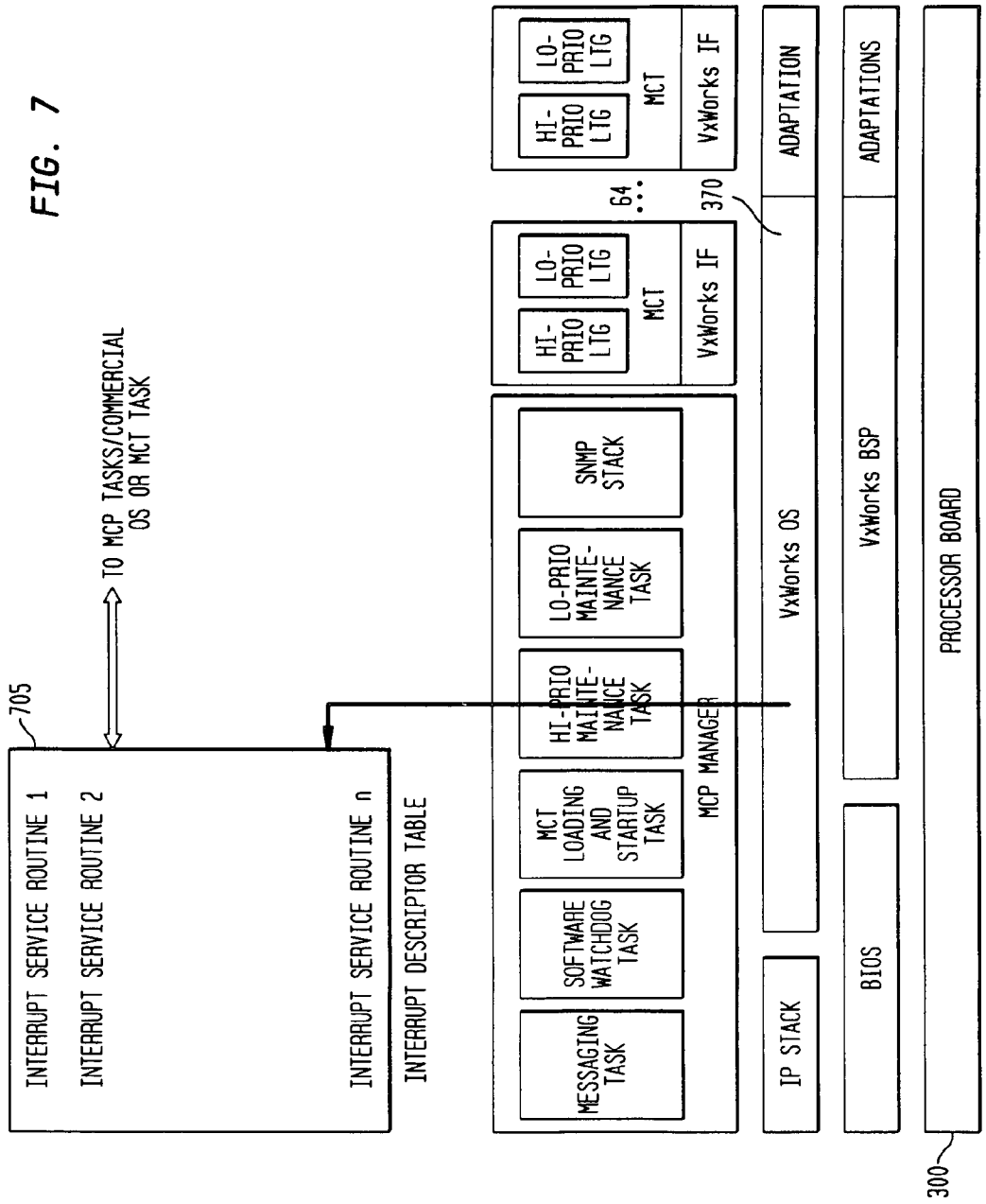
FIG. 7 is a block diagram showing the Interrupt Descriptor Table.

Referring now to FIG. 7, another adaptation for this present invention is shown. The usual interrupt service routine (ISR) of the VxWorks OS, 370, is replaced by "shell ISRs". Using an Interrupt Descriptor Table, 705, a VxWorks interrupt or exception is translated to a "shell ISR". A "shell ISR" has two functions. In the case of interrupts, it saves all the CPU registers of the interrupted task and restores the CPU OS default registers before invoking of the OS original ISR. In the case of exceptions, a shell function checks if the current task is a "MCP-task" (i.e., VxWorks task, 32 bit code) or a "MCT task" (i.e., 16 bit legacy code). If a MCP task, the original VxWorks ISR is invoked. Otherwise, the legacy ISR is invoked. This unique and novel approach allows 16-bit and 32-bit mix-mode ISR software operations to operate smoothly in the same platform.

The default VxWorks stack fault exception handler first determines whether the fault occurred within a MCT or in the general VxWorks context (kernel or other MCP tasks). If the fault occurred in the general VxWorks context, then the platform is restarted since this represents a non-recoverable error. However, if the fault occurred in a MCT, then the task state of the MCT is modified so that it resumes execution at the existing stack fault recovery software within the MCT. The exception handler also rebuilds the MCT stack so that it can resume operations correctly. Each MCT is responsible for handling its own exceptions.

The MCTs also needs to interface to certain VxWorks services. Since MCTs operate in 16-bit mode and are separately linked, this interface cannot be implemented via a direct call. Instead an indirect reference interface is used through "call gates". On activation of the MCTs, a reserved descriptor entry in the GDT is configured to represent a call gate. When the MCT invokes this call gate, it is redirected to execute a procedure within the VxWorks image, whose address has been populated in the call gate descriptor. A translation from 16-bit to 32-bit also occurs. This is another mixed-mode adaptation of this present invention.

Figure 8:
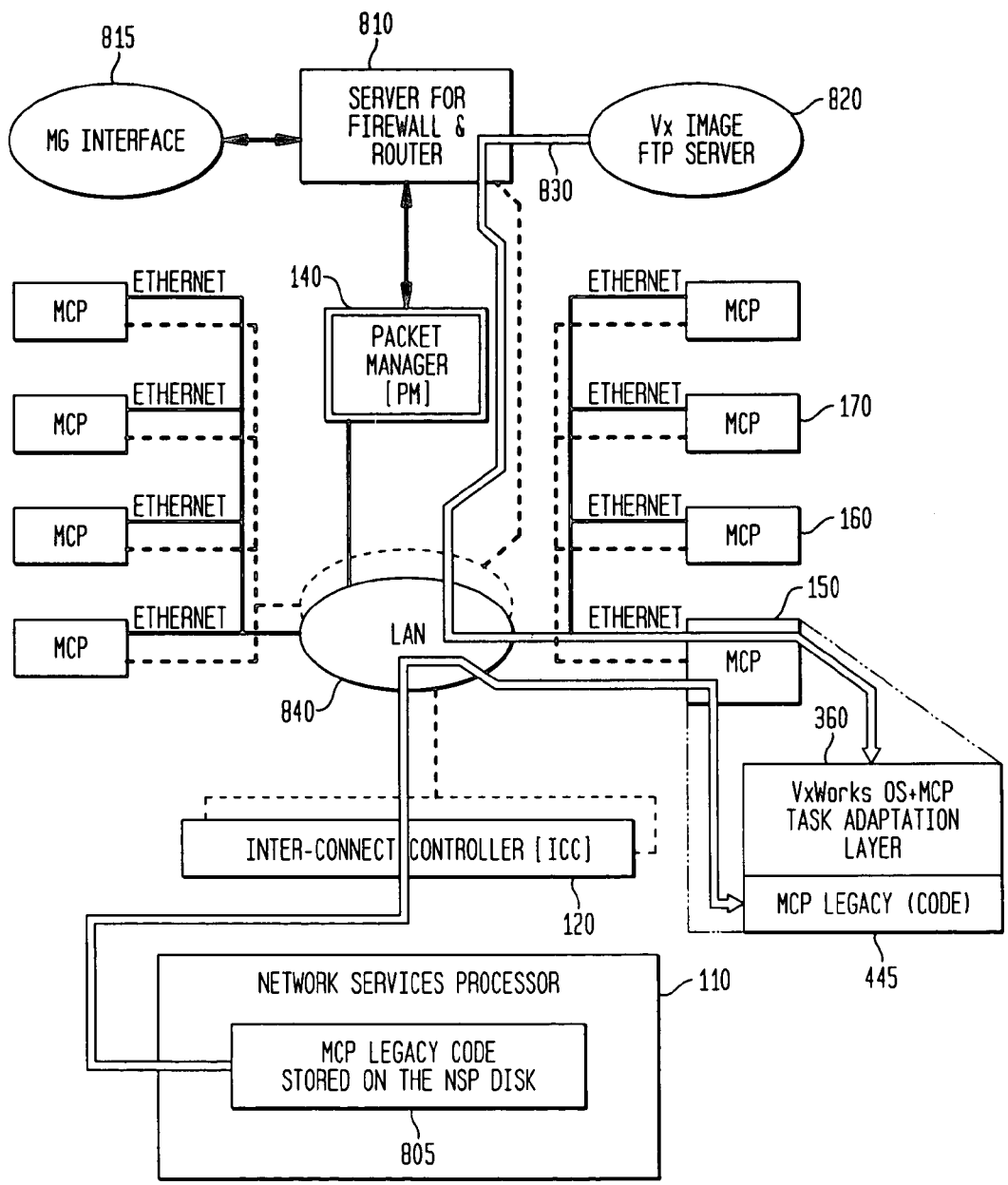
FIG. 8 is a block diagram showing remote software loading.

Referring now to FIG. 8 and the flow diagram of FIG. 9, which starts at 900. When a MCP platform, 150, powers up or resets, the MCP software environment is created and initialized. The boot process of a MCP (not shown) retrieves via File Transfer Protocol (FTP) the VxWorks and MCP application (e.g., the adaptation layer) image from a remote server, 820, and step 905. This server can be anywhere on the local or remote LAN, 840. It is possible that the soft-switch is located behind a firewall & router, 810, and this FTP transfer may traverse the firewall, which is connected with the packet manager of the soft-switch, 140. Also shown is a Media Gateway, 815, which interfaces the soft-switch to operating companies. It is conceivable that the FTP download would traverse this path. The OS runs and spawns the MCP tasks, step 910.

After the MCP tasks are spawned, a craftsperson enters a command at the NSP, 110, to initiate MCP legacy code (e.g., MCT code images) loading, step 915. This code is stored typically on a NSP disk, 805. Once the legacy code is loaded into the MCPs, step 915, the MCT code image is initiated and call processing is subsequently initiated, step 925.

In summary, this invention permits the reuse of TDM legacy software in a packet based soft-switch. An adaptation SW layer serves to isolate a legacy SW, known as MCT, from the commercial OS such as VxWorks. The legacy SW and the OS (and supporting functions) for example, is 16-bit and 32-bit SW respectively. The legacy SW is loaded and started by an adaptation, which calculates and creates a context memory area of each MCT appropriate to each image, step 920. The loading and startup task creates these context memory areas based on the original legacy GDT embedded in the legacy code received from a NSP. This context area includes memory sizing boundary information for each MCT working area, interface GDT for each MCT, transient data for each MCT, and configuration data area of for MCT. The configuration data configures call processing features. The MCTs (call processing) are started by the adaptation layer according to a bitmap received from the NSP. The context area also contains memory allocations for all call processing features for each MCT. The GDT of each MCT context area contains address and mapping information of the location of all MCT software entries for each instance of MCT. The context area also contains memory space for real-time processor task context storage for each MCT. As the OS creates regular time slices, shown as step 930, for the MCP tasks and MCT tasks and provides current and next task input to an adaptation software layer (such as Context-Switch), step 940, the adaptation layer accesses appropriate GDT areas swapping out the current task processor environment and swapping in the next tasks processor environment, step 945.

As processing occurs on the MCP platform, an adaptation layer shell ISR services interrupts, step 950. This adaptation layer shell ISR checks if the interrupt is for a 16-bit software current task or for a 32-bit current software task and passes control to the proper ISR using appropriate call linkages according to the target ISR, either an MCP or MCT ISR, step 955. This method continues at step 940 The method restarts on a power reset or fatal MCP error at step 900.

While the invention has been described in terms of preferred embodiments, those skilled in the art will recognize that the invention can be practiced with modifications and in the spirit and scope of the appended claims.

We claim:

1. A Media Control Platform (MCP) for use In a packet based soft-switch comprising:
   a microprocessor and memory;
   a local area network (LAN) interface;
   a software operating system (OS), said operating system providing software services, said software OS executed by said microprocessor;
   an Internet Protocol Stack, said Internet Protocol Stack under control of said software OS;
   a messaging task, said messaging task receiving messages from said LAN interface and said Internet Protocol Stack, said LAN interface and said messaging task under control of said software OS;
   an adaptation layer loading and startup task, said adaptation layer loading and startup task receiving software images from the messaging task and also storing said software Images Into said memory, said adaptation loading and startup task under control of said software OS;
   one or more media control task (MCT), said one or more MCT loaded and started by said adaptation layer loading and startup task, said media control task providing call feature, said one or more MCT under control of said software OS.

2. The Media Control Platform (MCP) for use in a packet based soft-switch as recited in claim 1, further comprising:
   a portion of said memory containing a context_table_(CTX) array, said
   context_(CTX) array contains address and mapping information of said one or more MCT.

3. The Media Control Platform (MCP) for use in a packet based soft-switch as recited in claim 2, wherein said context_table_(CTX) array further comprises:
   a global descriptor table (GDT) for each MCT instance, said GDT contains
   linking addresses for said each MCT instance.

4. The Media Control Platform (MCP) for use in a packet based soft-switch as recited in claim 2, wherein said context_table_(CTX) array further comprises:
   a global descriptor table (GDT) for each MCT instance, said GDT for each MCT instance contains context storage and transient data storage.

5. The Media Control Platform (MCP) for use in a packet based soft-switch as recited in claim 2, wherein said context_table_(CTX) array further comprises:
   a global descriptor table (GDT) for each MCT instance, said GDT for each MCT instance contains configuration data, said configuration data configures call processing features.

6. The Media Control Platform (MCP) for use in a packet based soft-switch as recited in claim 1, wherein said software services comprises:
   a software adaptation layer context switch, said software adaptation layer context switch swapping out a current task with a new task on a regular time interval, said context switch capable of mix-mode software operation.

7. The Media Control Platform (MCP) for use In a packet based soft-switch as recited in claim 1, wherein said software services comprises:
   a software adaptation layer interrupt service routine (ISR), said software
   adaptation layer ISR being a mixed-mode shell ISR.

8. The Media Control Platform (MCP) for use in a packet based soft-switch as recited in claim 1, wherein said software services comprises:
   a software adaptation layer call gate, said software adaptation layer call gate providing an indirect reference interface from said one or more MCT.

9. The Media Control Platform (MCP) for use in a packet based soft-switch as recited in claim 1, wherein the MCP is coupled to a Network Services processor.

10. The Media Control Platform (MCP) for use in a packet based soft-switch as recited in claim 1, wherein the MCP is coupled to a Packet Manager.

11. The Media Control Platform (MCP) for use in a packet based soft-switch as recited in claim 1, wherein the LAN interface in Ethernet.

12. The Media Control Platform (MCP) for use in a packet based soft-switch recited in claim 1, wherein said one or more media control task (MCT) is Time Division Multiplexing (TDM) legacy software.

13. A Media Control Platform (MCP) for use in a packet bused soft-switch comprising:
   a microprocessor and memory;
   a local area network (LAN) interface;
   a software operating system (OS), said operating system providing software services, said software OS executed by said microprocessor;
   an Internet Protocol Stack, said Internet Protocol Stack under control of said software OS;
   a messaging task, said messaging task capable of receiving messages from said LAN interface and said Internet Protocol Stack, said LAN interface and said messaging task under control of said software OS;
   an adaptation layer loading and startup task, said adaptation layer loading and startup task receiving software images from the messaging task and also storing said software Images into said memory, said adaptation loading and startup task under control of said software OS;
   one or more media control task (MCT), said one or more MCT loaded and started by said adaptation layer loading and startup task, said media control task providing call control features;, said one or more MCT under control of said software OS;
   a simple network management protocol stack (SNMP), said SNMP under control of said software OS;
   a software adaptation layer context switch, said software adaptation layer context switch swapping out a current task with a new task on a regular time interval, said software adaptation layer context switch performs mix-mode software operation, said software adaptation layer context switch under control of said software OS.

14. The Media Control Platform (MCP) for use in a packet based soft-switch as recited in claim 13, wherein said software services comprises:
   a software adaptation layer interrupt service routine (ISR), said software adaptation layer ISR being a mixed-mode shell ISR.

15. The Media Control Platform (MCP) for use in a packet based soft-switch as recited in claim 13, further comprising:
   a portion of said memory containing a context_table_(CTX) array, said context_table_(CTX) array contains address and mapping information of said one or more MCT.

16. The Media Control Platform (MCP) for use in a packet based soft-switch as recited in claim 15, wherein said context_table_(CTX) array further comprises:
   a global descriptor table (GDT) for each MCT instance, said GDT contains linking addresses for said each MCT instance.

17. The Media Control Platform (MCP) for use in a packet based soft-switch as recited claim 15, wherein said context_table_(CTX) array further comprises:
   a global descriptor table (GDT) for each MCT instance, said GDT for each MCT instance contains context storage and transient data storage.

* * * * *